C. W. KAUFMANN.
ATTACHMENT FOR CAMERAS.
APPLICATION FILED DEC. 3, 1907.
962,844.
Patented June 28, 1910.
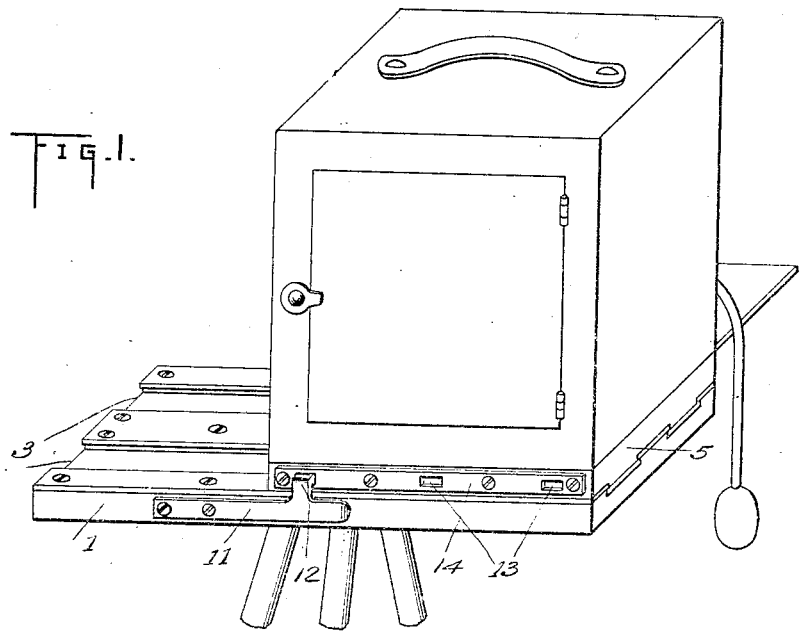
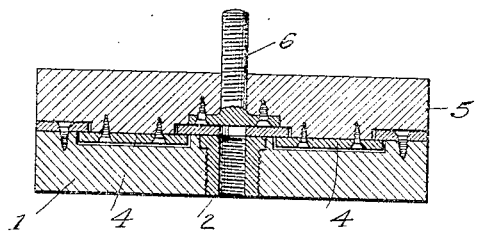
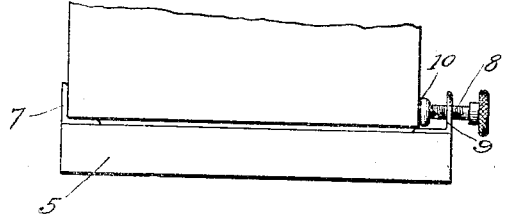
Witnesses
Joseph N Holzer
Ernest F Riley
Inventor
Charles W. Kaufmann
By Bevans & Bevans
his Attorneys

UNITED STATES PATENT OFFICE.

CHARLES W. KAUFMANN, OF NEW YORK, N. Y.

ATTACHMENT FOR CAMERAS.

962,844.  Specification of Letters Patent.  Patented June 28, 1910.

Application filed December 3, 1907. Serial No. 404,949.

*To all whom it may concern:*

Be it known that I, CHARLES W. KAUFMANN, a citizen of the United States, residing at New York city, in the borough of Bronx and State of New York, have invented certain new and useful Improvements in Attachments for Cameras, of which the following is a specification.

The invention is an improvement in camera attachments and has in view a device applicable to a tripod and to any ordinary camera to adapt the latter to make stereoscopic pictures.

To this end the invention consists of a base member having means substantially centrally arranged for detachably applying it to the tripod, and a sliding member carried on the base member and having means for securing flat to its upper face the base of any ordinary form of camera, and means to lock the sliding member centrally over the tripod and at equal distances to each side of a central position.

Reference is to be had to the accompanying drawings forming a part of this specification, in which similar characters of reference indicate corresponding parts in all the views.

Figure 1 is a perspective view of an attachment constructed in accordance with my invention, a camera and portion of a tripod being shown in connection therewith; Fig. 2 is a vertical sectional view through the attachment; and Fig. 3 is a side elevation of the sliding member of the attachment provided with a clamping-device to be used in connection with certain cameras.

Referring now more particularly to the drawing, the numeral 1 indicates the base-member or table of the attachment having a screw-threaded socket 2 arranged centrally to receive the usual securing-screw carried by the tripod-head. Formed on the upper face of the base-member are longitudinally-extending grooves 3 arranged at each side of the socket, with plates attached to the base-member and overhanging the edges of the grooves forming undercut ways to receive similar plates 4 secured to a sliding member or camera carrier in the nature of a block 5 and similarly arranged with respect to grooves formed in its under face, the last-named grooves constituting ways for the plates of the base member. The sliding-member is of sufficient size to support the camera and is provided with a central screw 6 to engage the usual screw-threaded socket of the camera. Said screw 6 may be either fixed as shown or loose in the sliding-member. In lieu of the screw 6, for cameras not provided with the screw-threaded socket, a clamping device may be employed consisting of a plate 7 at one edge of the sliding-member against which the camera is clamped by a clamping-screw 8 carried by a bracket 9 at the opposite edge of said member, said screw having a head 10 loose thereon to engage the camera. The sliding-member may be provided with a loose or removable screw 6 and with the clamping-device described, in which event any camera might be used in connection with the attachment.

It will be understood that in taking pictures for stereoscopic views, by the use of my attachment, one exposure may be made and the sliding-member with the camera thereon moved along the base-member to proper position and the second exposure made. For locking the sliding-member in the desired position I provide a locking-device comprising a spring-member 11 secured at one end to the edge of the base-member and having its free end bent outwardly therefrom to form a finger-hold whereby a detent 12 carried intermediately of its ends may be disengaged from the slots 13 of a plate 14 secured to one edge of the sliding-member. Said plate is formed with three of these slots, one at its center and one adjacent to each end.

In the drawing the camera is shown in position to take one view for a stereoscopic picture. After the exposure is made, the spring-member is pressed outwardly at its free end to disengage the detent from the slot. The sliding-member is then moved along the base-member until the slot at the opposite end thereof is in position to be engaged by the detent. The camera is then in position for the second exposure. When the camera is to be used for ordinary work, the sliding-member may be moved to position with its center slot in engagement with the detent, in which position the camera is arranged centrally with respect to the base-member and the tripod.

From the above description it will be seen that I have provided an attachment by means of which any ordinary camera may be adapted for taking pictures for stereoscopic views, the attachment being of such size and form that it may be carried either in the carrying case with the camera or in the pocket.

Having thus described my invention I claim as new and desire to secure by Letters Patent:

1. The combination of a tripod, a base member having means substantially centrally arranged to secure it to the head of the tripod, a member supported at successive points throughout its length on and slidably engaged with the base member, having means to secure the base of a camera flat to the upper face thereof, and means to lock the two members together, with the upper member in a position centrally over the tripod or at an equal distance to either side of a central position.

2. The combination in a camera attachment, of a base member having grooves in the upper face thereof and provided with plates each overhanging an edge of one of the grooves, forming undercut ways, and a camera-carrying member having grooves on its under face to receive the plates of the base member and having plates secured thereto and arranged in the grooves of the base member, with the edges of the two sets of plates in sliding engagement.

In testimony whereof I affix my signature, in presence of two witnesses.

CHARLES W. KAUFMANN.

Witnesses:
JACOB FRANK,
WILLIAM KEMPF.